United States Patent
Park

(10) Patent No.: US 7,860,850 B2
(45) Date of Patent: Dec. 28, 2010

(54) SCANNING FILES USING DIRECT FILE SYSTEM ACCESS

(75) Inventor: Seung Bae Park, Lidcombe (AU)

(73) Assignee: Symantec Corporation, Mountain View, CA (US)

( * ) Notice: Subject to any disclaimer, the term of this patent is extended or adjusted under 35 U.S.C. 154(b) by 308 days.

(21) Appl. No.: 11/707,342

(22) Filed: Feb. 16, 2007

(65) Prior Publication Data

US 2007/0208689 A1 Sep. 6, 2007

Related U.S. Application Data

(60) Provisional application No. 60/779,072, filed on Mar. 3, 2006.

(30) Foreign Application Priority Data

Mar. 6, 2006 (AU) .............................. 2006901125

(51) Int. Cl.
*G06F 7/00* (2006.01)
*G06F 21/22* (2006.01)
(52) U.S. Cl. ........................................ 707/705; 726/24
(58) Field of Classification Search .................... 707/1; 726/24
See application file for complete search history.

(56) References Cited

U.S. PATENT DOCUMENTS

| | | | | |
|---|---|---|---|---|
| 7,216,367 | B2* | 5/2007 | Szor | 726/25 |
| 2004/0010703 | A1* | 1/2004 | Kouznetsov et al. | 713/200 |
| 2004/0103417 | A1* | 5/2004 | Voellm et al. | 719/331 |
| 2006/0179484 | A1* | 8/2006 | Scrimsher et al. | 726/23 |
| 2006/0294592 | A1* | 12/2006 | Polyakov et al. | 726/24 |
| 2007/0016914 | A1* | 1/2007 | Yeap | 719/328 |
| 2007/0079178 | A1* | 4/2007 | Gassoway | 714/38 |
| 2007/0180529 | A1* | 8/2007 | Costea et al. | 726/24 |

OTHER PUBLICATIONS

Kasslin et al. "Hide'n Seek Revisited-Full Stealth is back" Virus Bulletin Conference Oct. 2005 (hereafter Kisslin).*
Web page, Wikipedia Encyclopedia, en.wikipedia.org/wiki/Rootkit (5 pgs.), Feb. 3, 2006.
Web page, SearchWindowsSecurity.com, searchsecurity.techtarget.com/tip/1,289483,sid14_gci1103744,00.html (4pgs.) May 6, 2005.
Web page, SearchSecurity.com, searchwindowssecurity.techtarget.com/originalContent/0,289142,sid45_gci10864 (5 pgs.) Jul. 6, 2005.

* cited by examiner

*Primary Examiner*—Etienne P LeRoux
*Assistant Examiner*—Cindy Nguyen
(74) *Attorney, Agent, or Firm*—Holland & Hart LLP

(57) ABSTRACT

Scanning engine (i.e. program(s) or application(s)) 310 sends request 315 to direct file system access engine (i.e. program (s) or application(s)) 360. Direct file system access engine 360 receives request 315 and passes request 315 to file system (s) 350 as request 325. No filter program(s) 340 receive program control as request 325 bypasses any filter program(s) 340. The direct file system access engine 360 receives unaltered information from file system(s) 350. Utilising Direct File Access (DFA) allows bypass of user mode hooking-type malwares, kernel, and file system filter programs to obtain access to or communicate with the real underlying file system (s). This provides a 'clean' view of the file system(s) in situations where user/kernel components are compromised or rootkit file system filter programs are installed.

17 Claims, 3 Drawing Sheets

SCANNING FILES USING DIRECT FILE SYSTEM ACCESS

TECHNICAL FIELD

The present invention generally relates to accessing one or more file systems, for example scanning files in a computer or computer system, and more particularly to a method, system and/or computer program, such as software, for detecting malware that may be protected or guarded by one or more rootkits.

BACKGROUND ART

A rootkit is a set of software tools frequently used by an intruder after gaining access to a computer system. These software tools are intended to conceal running processes, files or system data, which helps an intruder maintain covert or furtive access to a computer system. A rootkit is not a virus or trojan. Viruses modify a computer system file to propagate itself. Trojans masquerade as software and provide access for a hacker. Both of these techniques are susceptible to detection (see Wikipedia contributors (2006). Rootkit. Wikipedia, The Free Encyclopedia. Retrieved 06:57, Mar. 2, 2006 from http://en.wikipedia.org/w/index.php?title=Rootkit&oldid=41813778).

In contrast, a rootkit is intended to allow an intruder access to a computer system without leaving any trace. The term "kit" is used because software components work collectively to achieve the desired covertness or furtiveness. A rootkit can include additional software components for other malicious behaviour, such as "key loggers" and "packet sniffers" (see Berg, Al. The Root Of The Rootkit, SearchSecurity.com, July 2005, http://searchsecurity.techtarget.com/tip/1,289483,sid14_gci1103744,00.html).

In order to further enhance stealth capabilities of rootkits, the authors of rootkits are employing more advanced stealth methods so that normal programs that utilise operating system (Application Programming Interfaces) APIs or third party libraries are unable to detect and remove rootkits.

Rootkits are generally classified into two categories: (1) user mode (or application level mode) or (2) kernel mode. The former involves elementary binary file replacement while the latter embeds itself intricately into the operating system (see Dillard, Kurt. What Are User-Mode vs. Kernel-Mode Rootkits, SearchWindowsSecurity.com, May 2005, http://search-windowssecurity.techtarget.com/originalContent/0,289142,sid45_gci1086469,00.html). Kernel level rootkits add additional code and/or replace a portion of kernel code with modified code to help hide a backdoor on a computer system. This is often accomplished by adding new code to the kernel via a device driver or loadable module, such as Loadable Kernel Modules in the Linux operating system or device drivers in the Windows operating system. Kernel rootkits commonly patch, hook, or replace system calls with versions that hide information about the attacker. Application level, or user mode, rootkits may replace regular application binaries with Trojan fakes, or they may modify the behaviour of existing applications using hooks, patches, injected code, or other means. Kernel rootkits can be especially dangerous because they can be difficult to detect.

There are inherent limitations to any program that attempts to detect rootkits. Rootkits are collections of programs which modify the tools or libraries upon which programs on the system depend. Some rootkits can modify the running kernel. A problem with rootkit detection is that the operating system cannot be trusted.

Filter Program:

A filter program is a program that takes control of the execution of a program, and that can monitor, redirect, alter the execution path, or forge the result. A filter program can be located anywhere between one or more programs, for example in an operating system, and a file system(s). A filter program may be part of a rootkit.

File System:

A file system is a system for organising directories and files, generally in terms of how the file system is implemented in the operating system. File systems may, but need not necessarily, use a storage device, such as a hard disk, or they may be virtual and exist only as an access method for virtual data or for data over a network. More formally, a file system is a set of abstract data types that are implemented for the storage, hierarchical organisation, manipulation, navigation, access, and retrieval of data. File systems need not make use of a storage device at all, a file system can be used to organise and represent access to any data, whether it be stored or dynamically generated (e.g., from a network connection).

Computer System:

A computer system may be a type of processing system, terminal, computer or computerised device, personal computer (PC), mobile or cellular telephone, mobile data terminal, portable computer, Personal Digital Assistant (PDA), pager or any other similar type of device. The capability of such a computer system to process, request and/or receive information or data can be provided by software, hardware and/or firmware. A computer system may include or be associated with other devices, for example a local data storage device such as a hard disk drive or solid state drive. A computer with a rootkit is sometimes called a rooted computer.

Presently, the stealth of a rootkit and the access to computer systems which can be exploited present a significant security threat to computer systems and networks.

Often rootkits are used in combination with otherwise normally detectable malware. As a result, the number of malwares (a portmanteau word of "malicious software") that normal malware scanning software does not detect is presently increasing.

There is a need for a method, system and/or computer program which addresses or at least ameliorates problems inherent in the prior art.

The reference to any prior art in this specification is not, and should not be taken as, an acknowledgment or any form of suggestion that such prior art forms part of the common general knowledge.

DISCLOSURE OF INVENTION

According to a first broad form, the present invention provides a method of accessing one or more file systems, the method including: a scanning engine sending a request to a direct file system access engine; the direct file system access engine receiving the request and in response thereto sending a further request to at least one file system; the direct file system access engine receiving response information from the at least one file system; and the direct file system access engine sending the response information to the scanning engine.

According to a second broad form, the present invention provides a system for accessing one or more file systems, the system including: a storage device to house at least part of a file system; at least one memory to store a scanning engine and a direct file system access engine; at least one processor, in communication with the at least one memory and the storage device, the at least one processor adapted to: (a) send a request from the scanning engine to the direct file system access engine; (b) allow the direct file system access engine to receive the request and in response thereto to send a further request to the file system; (c) allow the direct file system access engine to receive response information from the file system; and (d) send the response information from the direct file system access engine to the scanning engine.

According to a third broad form, the present invention provides a computer program for accessing one or more file systems, the computer program adapted to: send a request to a direct file system access engine, the direct file system access engine receiving the request and in response thereto sending a further request to at least one file system, the direct file system access engine receiving response information from the at least one file system; and, receive the response information from the direct file system access engine.

In accordance with a specific optional embodiment, provided by way of example only, the scanning engine and/or the direct file system access engine is one or more of, separately or in combination, a program, a driver or an application. Optionally, but not necessarily, the direct file system access engine is one or more Windows DFA kernel driver.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

The following modes, given by way of example only, are described in order to provide a more precise understanding of the subject matter of a preferred embodiment or embodiments.

Figure 1:
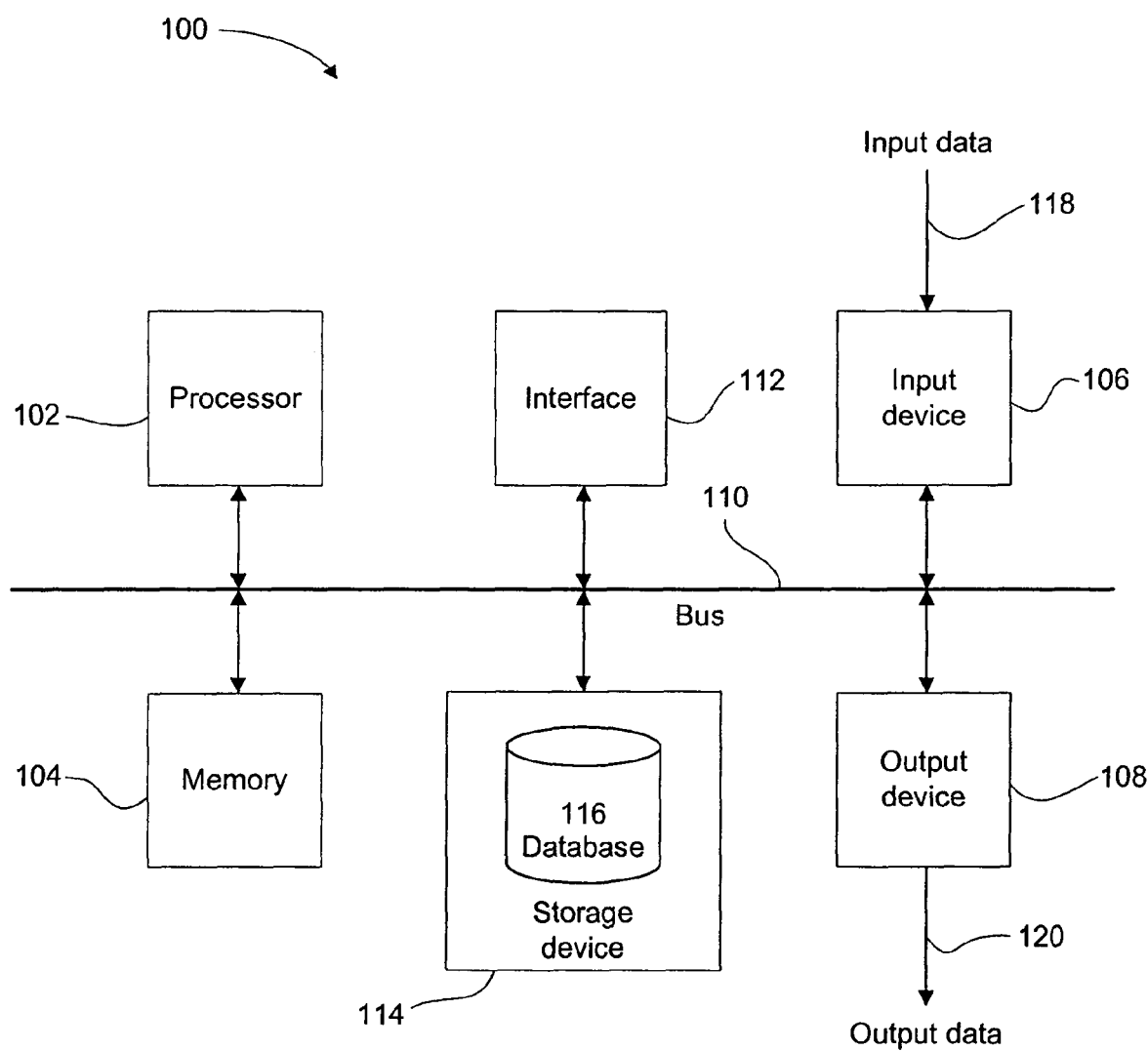
FIG. 1 illustrates an example functional block diagram of a processing system that can be utilised to embody or give effect to a particular embodiment.

A particular embodiment of the present invention can be implemented on a computer system, or more generally a processing system, an example of which is shown in FIG. 1. In particular, processing system 100 generally includes at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling processing system 100 to one or more peripheral devices, for example interface 112 could be a PCI card or PC card. At least one storage device 114 which houses at least one database 116 can also be provided. Memory 104 can be any form of memory device, for example, volatile or non-volatile memory, solid state storage devices, magnetic devices, etc. Processor 102 could include more than one distinct processing device, for example to handle different functions within processing system 100.

Memory 104 typically stores an operating system to provide functionality to processing system 100. A file system and files are also typically stored on storage device 114, and/or perhaps memory 104.

Input device 106 receives input data 118 and can include, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can include, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. Storage device 114 can be any form of data or information storage means, for example, volatile or non-volatile memory, a hard disk drive, solid state storage devices, magnetic devices, etc.

In use, processing system 100 is adapted to allow data or information to be stored in and/or retrieved from, via wired or wireless communication means, the at least one database 116. Interface 112 may allow wired and/or wireless communication between the processing unit 102 and peripheral components that may serve a specialised purpose. The processor 102 may receive instructions as input data 118 via input device 106 and can display processed results or other output to a user by utilising output device 108. More than one input device 106 and/or output device 108 can be provided. It should be appreciated that processing system 100 may be any form of terminal, server, specialised hardware, computer, computer system or computerised device, personal computer (PC), mobile or cellular telephone, mobile data terminal, portable computer, Personal Digital Assistant (PDA), pager or any other similar type of device.

Figure 2:
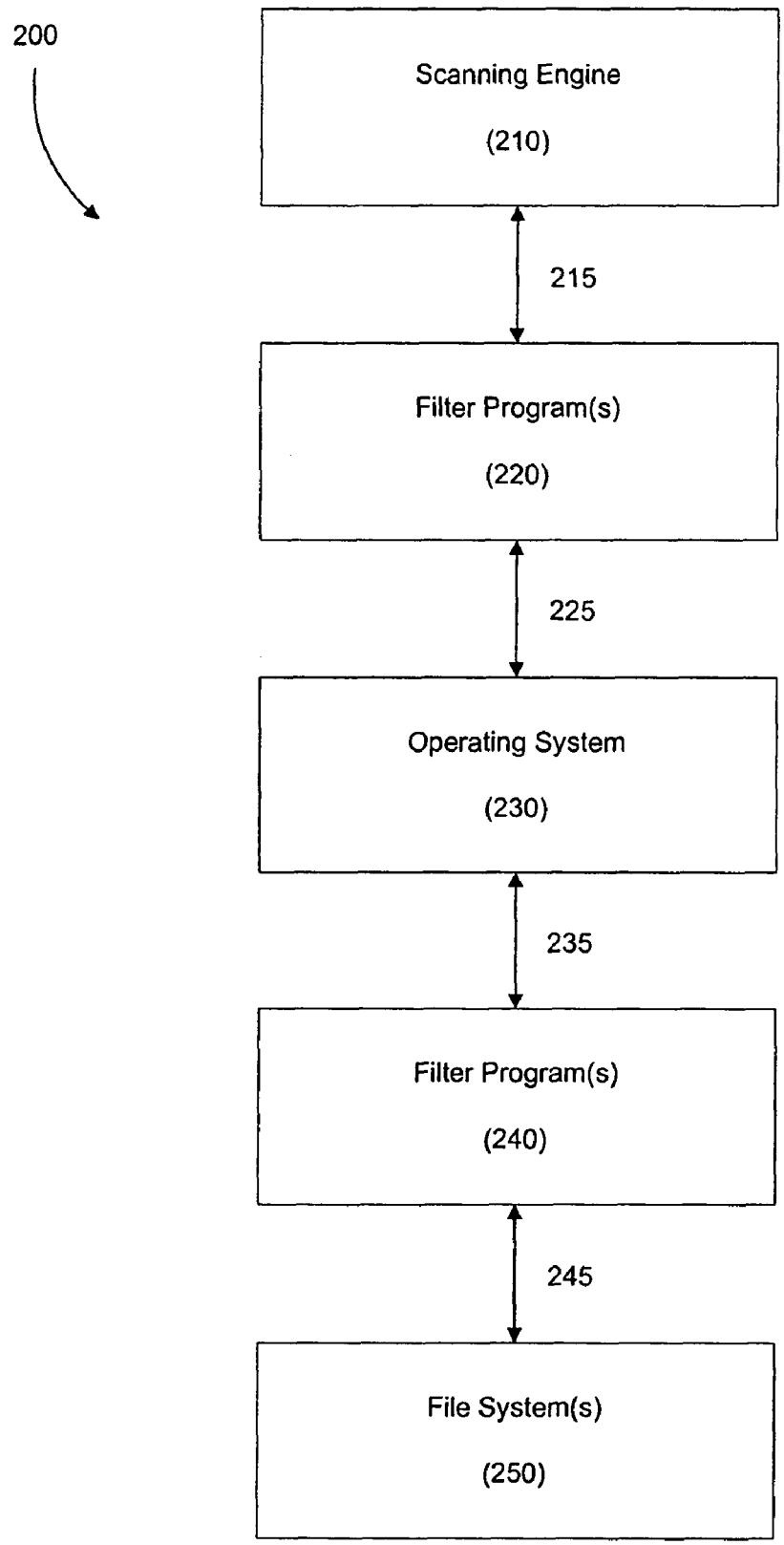
FIG. 2 (prior art) illustrates the currently used method of scanning a file system.

Referring to FIG. 2 (prior art), there is illustrated a simplified summary of the steps 200 required to scan a file system(s) using currently known security systems/methods. These steps 200 are as follows:

1. Scanning engine (i.e. program(s) or application(s)) 210 sends a request 215 to operating system 230.
    a. Request 215 sent by scanning engine 210 may be sent directly to operating system 230.
    b. Alternatively, request 215 sent by scanning engine 210 may be transferred to intermediate filter program 220 which then produces request 225 to be sent to operating system 230.
2. Filter program 220 can thus obtain control and pass control to operating system 230.
    a. Filter program 220 may take one of the following actions.
        i. Forward request 215 to another filter program.
        ii. Forward request 215, as request 225, to operating system 230, in which case filter program 220 may return forged information to scanning engine 210 when operating system 230 returns information.
        iii. Decline request 215.
    b. If another filter program receives control from filter program 220, then this other filter program may recursively perform step 2a.
3. When operating system 230 obtains control, operating system 230 sends a request 235 to file system 250.
    a. Request 235, sent by operating system 230 may be sent directly to file system 250.

b. Alternatively, request 235 sent by operating system 230 may be transferred to intermediate filter program 240.
4. Filter program 240 can thus obtain control and pass control to the file system 250.
   a. Filter program 240 may take one of the following actions.
      i. Forward request 235 to another filter program.
      ii. Forward request 235, as request 245, to file system 250, in which case filter program 240 may return forged information to operating system 230 when file system 250 returns information.
      iii. Decline request 235.
      iv. If another filter program receives control from filter program 240, then this other filter program may recursively perform step 4a.

In currently known scanning engines, the scanning engine simply utilises Windows API. For example, known rootkit detection programs include Rootkit Revealer from Sysinternals™, RkDetector™ and IceSword™.

These rootkit detection programs detect currently known rootkits by comparing results from the operating system (OS) to an actual listing read from the disk itself. However, this approach also uses the operating system calls to view the direct in-disk file system, which could be forged by rootkits that lie between the rootkit detection program and the real hard-disk.

As a further illustrative example, known rootkit detection program RkDetector™ v2.0 also deletes files hidden by rootkits while the system is running. Once erased and after a system reboot, rootkit files are not loaded because data contained therein is now corrupted.

A problem with this type of in-disk file system access is that occasionally it is not possible to scan hidden files in certain file systems (e.g. NTFS) that support self-encryption/compression. In other words, NTFS, for example, has the capability to compress and/or encrypt files. If a file hidden by a rootkit is compressed and/or encrypted, a normal scanning engine (i.e. program(s) or application(s)) is unable to scan the content of the file to see whether the file is malicious or not.

Figure 3:
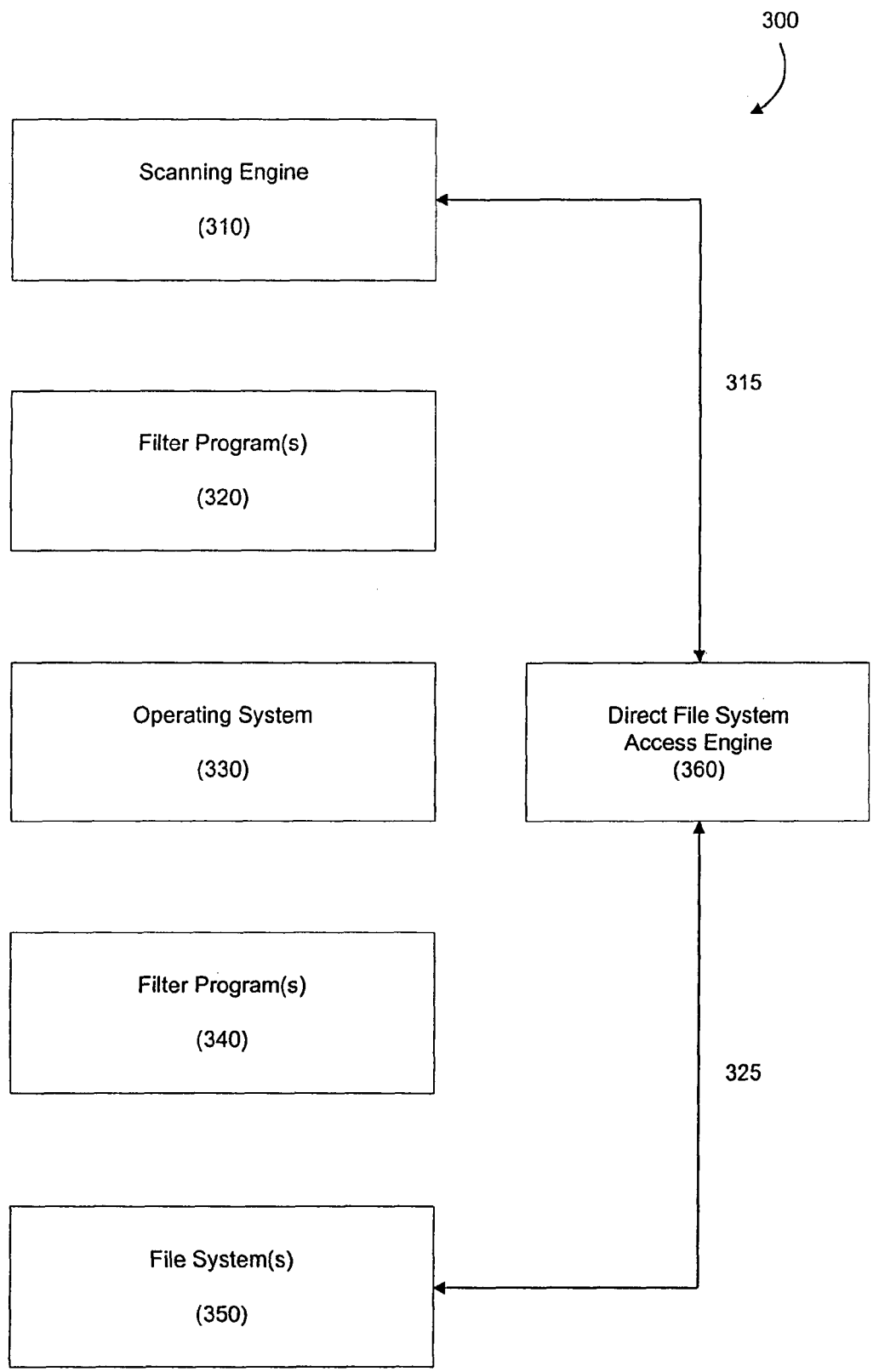
FIG. 3 illustrates an example method of scanning a file system according to the present invention.

A particular example embodiment of the present invention is now described with reference to FIG. 3. which displays a simplified summary of a method 300 to scan a file system(s). Method 300 includes steps as follows:

1. Scanning engine (i.e. program(s) or application(s)) 310 sends request 315 to direct file system access engine (i.e. program(s) or application(s)) 360 and receives information from direct file system access engine 360.
   a. Request 315 sent by scanning engine 310 is sent to direct file system access engine 360 along a path that is not associated with the nature of the request.
   b. Request 315 sent by scanning engine 310 is transferred to direct file system access engine 360, bypassing any filter program(s) 320.
   c. Direct file system access engine 360 returns the information received from file system(s) 350 back to scanning engine 310, bypassing any filter program(s) 340.
2. Direct file system access engine 360 sends the request received from scanning engine 310 to file system(s) 350 and returns the information returned from file system(s) 350 to scanning engine 310.
   a. No filter program(s) 340 receives program control during this procedure as request 325 bypasses any filter program(s) 340.
   b. Support to pass a request to file system(s) 350 from operating system 330 does not include any operating system functions directly related to the nature of the request.
   c. The direct file system access engine 360 receives the information received from file system(s) 350, which is not altered by filter program(s) 340.
3. The functionality implemented by direct file system access engine 360 includes, but is not limited to:
   a. Enumerate Directory;
   b. Open File;
   c. Close File;
   d. Read File;
   e. Write File;
   f. Delete File;
   g. Query File Information; and/or
   h. Set File Information.

Utilising Direct File Access (DFA) allows a direct file system access approach with minimal OS support. Using a DFA kernel program, the present example embodiment can bypass user mode hooking-type malwares, operating system kernel, and file system filter programs to obtain access to or communicate with the real underlying file system(s). This provides a 'clean' view of the file system(s) in situations where operating system user/kernel components are compromised or rootkit file system filter programs are installed.

The present example embodiment can be used to defeat rootkits by making use of one or more of the following techniques, provided by way of example only:
   i. User mode operating system compromise;
   ii. Hooking or modifying operating system programs (e.g. kernel32.dll, ntdll.dll, etc);
   iii. Kernel mode operating system compromise;
   iv. Kernel mode Interrupt Descriptor Table (IDT) hook;
   v. Kernel mode SYSENTER/SYSEXIT hook;
   vi. Kernel mode Service Descriptor Table (SDT) hook;
   vii. Kernel mode System Service Table (SST; NT Native API) hook;
   viii. Kernel mode file system filter; and/or
   ix. Kernel mode file system filter programs.

The present example embodiment is also capable of reading the EXCLUSIVELY locked files. Information retrieved by DFA does not conflict with information received by a normal operating system API route in the absence of rootkits. This allows transparent access to the underlying file system(s) without any compatibility issues with operating system APIs.

In a specific, non-limiting, example applied to the Windows operating system, OS functions used by the DFA kernel driver are not directly related to the nature of the file request. That is, operating system functions used by the kernel driver are not directly related to normal or standard operating system functions typically used for the request. For example, scanning engine (i.e. program(s) or application(s)) 210 normally uses CreateFile( ) Win32 API to open or create a file, FindFirstFile( )/FindNextFile( ) Win32 API to obtain a list of files in a specified directory, GetFileSize( ) Win32 API to obtain the file size, and so on. However, using a DFA interface, scanning engine (i.e. program(s) or application(s)) 310 can use DeviceIoControl( ) Win32 API to send a request 315 to the DFA kernel driver 360 running in kernel mode. Therefore, any user mode filter program(s) 320 are unable to detect this action. When DFA kernel driver 360 receives DeviceIoControl( ) 315, DFA kernel driver 360 creates a standard Windows kernel data structure, called IRP (I/O Request Packet) depending on the file request scanning engine 310 has made. For instance, IRP_MJ_CREATE is created and sent to the underlying file system(s) 350 using IoCreateFileSpecify- DeviceObjectHint( ) Windows Kernel API 325 by DFA kernel driver 360 to perform CreateFile requested by scanning engine 310 using DeviceIoControl( ) request 315. DFA kernel driver 360 creates IRP_MJ_QUERY_INFORMATION to query file information such as file size. IRP_MJ_DIRECTORY_CONTROL (with IRP_MN_QUERY_DIRECTORY code) is created for FindFirstFile/FindNextFile requested by scanning engine 310 using DeviceIoControl( ) request 315. The created IRPs are sent to the underlying file system(s) 350 using IoCallDriver( ) Windows Kernel API request 325. The return information is stored in the IRP and DFA kernel driver 360 passes information back to scanning engine 310 through the buffer passed in DeviceIoControl( ). Kernel mode rootkits hook Windows Native API (i.e. NtCreateFile( )) 330, which is the system call exposed to a user mode application program, or run as file system filter drivers 340. Because DFA kernel driver 360 neither calls Windows Native API 330 nor goes through the kernel mode filter drivers 340, DFA kernel driver 360 can access the underlying file system(s) 350 without detection by any kernel mode rootkits. Any file-related Win32 API functions used by scanning engine 310 can be performed in this way, bypassing any filter program(s) regardless of whether they are running in user mode or kernel mode.

Therefore, the OS kernel API being used by the DFA kernel driver is not directly connected to the nature of the file request being used. By avoiding the use of any standard Windows API or OS kernel API, any malware that intercepts the program control in the file access path (e.g. by hooking or in-line code patching), irrespective of its running mode (user or kernel mode), is unable to forge the information returned by the underlying real file system(s).

Thus, the present example embodiment's use of DFA is able to transparently perform operations on a file in a file system (i.e. open, read, write, query file information, set file information, delete file, close or the like) since the present example embodiment uses the file system to perform operations on the file instead of directly accessing the disk, or other storage means, and trying to simulate the file system driver's behaviour.

The present invention may be implemented separately as stand-alone software or in combination with currently known systems/methods as a software package. When the present invention is embodied as a software package, this software package can be used to detect and remove malware, guarded by a rootkit, from a device, such as a computer, computer system, PDA, mobile or cellular telephone, or a wide variety of other similar devices.

Whilst an example embodiment has been described with reference to the Microsoft™ Windows operating system, the present invention can be readily applied to many other operating systems and should not be considered to be limited only to the Microsoft™ Windows operating system.

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The present invention may take the form of an entirely hardware embodiment, an entirely software embodiment, or an embodiment combining software and hardware aspects.

The claims defining the invention are as follows:

1. A method of accessing one or more file systems, the method including:
   a scanning engine sending a request to a direct file system access engine, wherein the request bypasses an operating system kernel;
   the direct file system access engine receiving the request and in response thereto sending a further request to at least one file system;
   the direct file system access calling at least one operating system function to execute the request, wherein the at least one operating system function is not directly related to standard operating system functions used to execute the request;
   the direct file system access engine receiving response information from the at least one file system; and
   the direct file system access engine sending the response information to the scanning engine.

2. The method as claimed in claim 1, wherein the scanning engine is one or more of: a program, a driver, and an application.

3. The method as claimed in claim 1, wherein the direct file system access engine is one or more of: a program, a driver, and an application.

4. The method as claimed in claim 1, wherein the direct file system access engine is a kernel driver.

5. The method as claimed in claim 1, further comprising employing a kernel driver to use operating system functions that are not directly related to normal operating system functions used for the request.

6. The method as claimed in claim 1, wherein the request is related to one or more of: Enumerate Directory; Open File; Close File; Read File; Write File; Delete File; Query File Information; and Set File Information.

7. The method as claimed in claim 1, wherein the further request is at least partially obtained by compromising a user mode operating system.

8. The method as claimed in claim 1, wherein the further request is at least partially obtained by hooking one or more operating system programs.

9. The method as claimed in claim 1, wherein the further request is at least partially obtained by compromising a kernel mode operating system.

10. The method as claimed in claim 1, wherein the further request is at least partially obtained using a kernel mode Interrupt Descriptor Table (IDT) hook.

11. The method as claimed in claim 1, wherein the further request is at least partially obtained using a kernel mode SYSENTER/SYSEXIT hook.

12. The method as claimed in claim 1, wherein the further request is at least partially obtained using a kernel mode Service Descriptor Table (SDT) hook.

13. The method as claimed in claim 1, wherein the further request is at least partially obtained using a kernel mode System Service Table (SST) hook.

14. The method as claimed in claim 1, wherein the further request is at least partially obtained using a kernel mode file system filter program.

15. A system for accessing one or more file systems, the system including:
   a storage device to house at least part of a file system;
   at least one memory to store a scanning engine and a direct file system access engine;

at least one processor, in communication with the at least one memory and the storage device, the at least one processor adapted to:

send a request from the scanning engine to the direct file system access engine, wherein the request bypasses an operating system kernel of the system;

allow the direct file system access engine to receive the request and in response thereto to send a further request to the file system;

allow the direct file system access to call at least one operating system function to execute the request, wherein the at least one operating system function is not directly related to standard operating system functions used to execute the request;

allow the direct file system access engine to receive response information from the file system; and send the response information from the direct file system access engine to the scanning engine.

16. A computer program product for accessing one or more file systems, the computer program product comprising a non-transitory computer-readable storage device having instructions thereon, the instructions comprising:

(1) code programmed to send a request to a direct file system access engine, wherein the request bypasses an operating system kernel, the direct file system access engine receiving the request and in response thereto sending a further request to at least one file system, the direct file system access engine calling at least one operating system function to execute the request, wherein the at least one operating system function is not directly related to standard operating system functions used to execute the request, the direct file system access engine receiving response information from the at least one file system; and (2) code programmed to receive the response information from the direct file system access engine.

17. The computer program product as claimed in claim 16, wherein the computer program product executes on a rooted computer.

\* \* \* \* \*